United States Patent Office 3,274,684
Patented Sept. 27, 1966

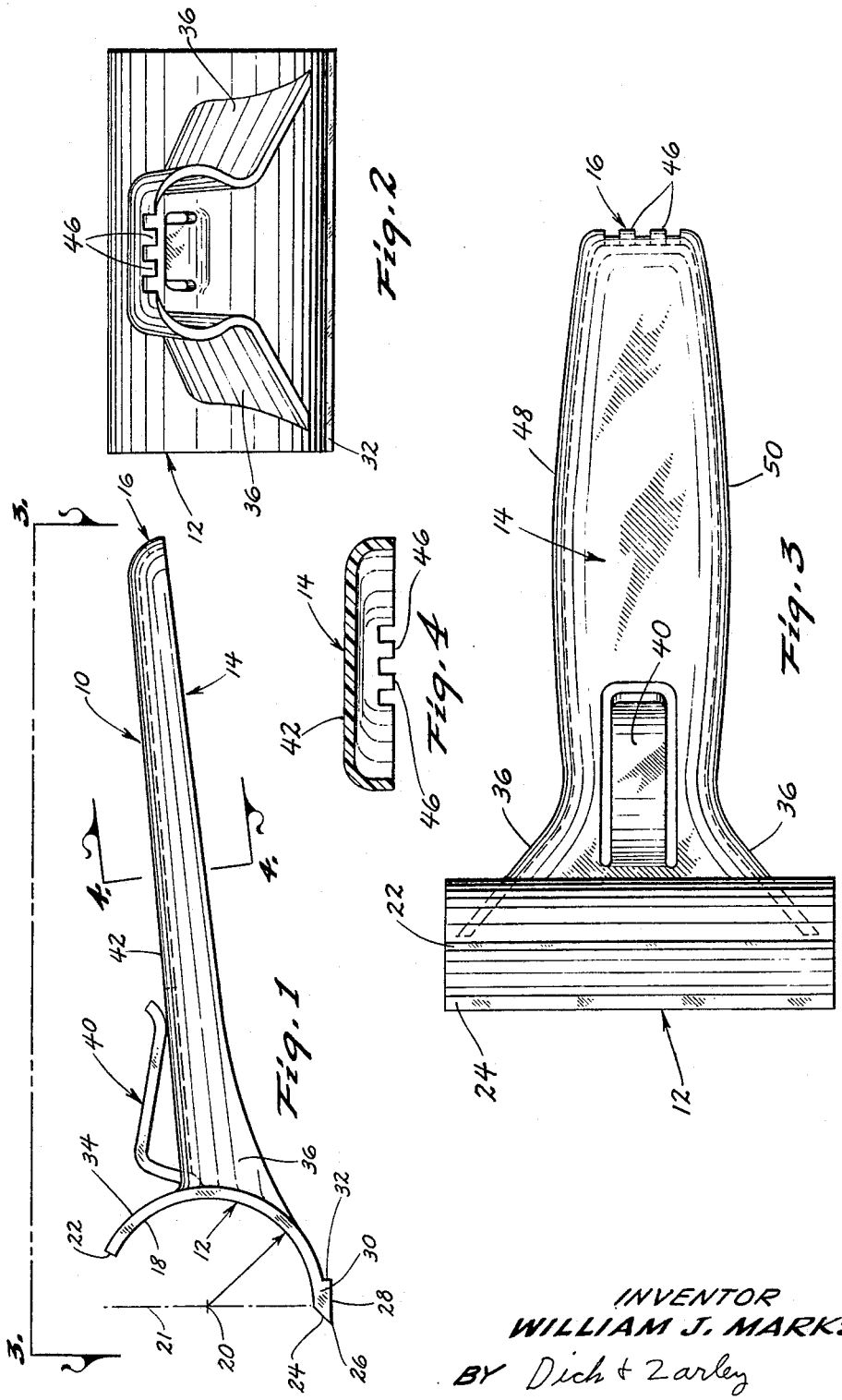

3,274,684
SCRAPER DEVICE
William J. Marks, 5348 W. Lazy Heart St., Tucson, Ariz.
Filed Dec. 17, 1964, Ser. No. 419,147
8 Claims. (Cl. 30—171)

This invention relates to a scraper device and more particularly to a snow and sleet scraper.

A common shortcoming with many of the available scraper devices is that they are so constructed to discharge the snow and ice rearwardly onto the handle and the hand of the user. Also, scraper devices heretofore have been designed only to remove the work product when the scraper is moved in only one direction.

Therefore, the principal objects of this invention are to provide a scraper device so designed that the scraping edge prevents the work product from being thrown back on the person using it, particularly his hand and wrist, and additionally having a scraper edge that will remove work product as it is being pulled in one direction and pushed in the opposite direction across the working surface.

A related object of this invention is to provide a scraper device having a cutting blade which throws the work product forwardly of the blade as it moves across the working surface.

Another related object of this invention is to provide a scraping device having a cutting blade with a shoe portion having front and rear scraping surfaces.

A still further object of this invention is to provide a scrapes device including a handle having a fastener means secured thereto.

Another object of this invention is to provide a scraper device having a handle with a cutting blade on each end thereof.

A still further object of this invention is to provide a scraper device having an elongated U-shaped handle.

A further object of this invention is to provide a scraper device which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a side elevational view of the scraper device of this invention;

FIG. 2 is a right end elevational view;

FIG. 3 is a top plan view taken along line 3—3 in FIG. 1; and

FIG. 4 is a cross-sectional view taken along line 4—4 in FIG. 1.

The scraper device of this invention is referred to generally in FIG. 1 by the reference numeral 10 and includes a cutting blade 12 mounted on one end of an elongated handle 14. A cutting blade 16 is provided on the handle at the opposite end from the cutting blade 12.

The cutting blade 12 as illustrated in FIG. 1 is disposed in a vertical plane and is provided with a concave front surface 18 having a constant radius of curvature about a center point 20. The center point 20 is disposed in a vertical plane 21 which meets the lower end of the concave surface 18. The upper end 22 of the blade 12 terminates rearwardly of the vertical plane 21.

From the lower end of the concave front surface 18 of the cutting blade 12 a downwardly and forwardly tapering surface 24 is provided. The tapering surface 24 terminates in a sharp edge 26 which is the forward end of a horizontal rearwardly extending surface 28 of a shoe portion 30. The bottom horizontal surface 28 terminates rearwardly in a vertically disposed rear surface 32 which extends vertically upwardly.

The cutting blade 12 is provided with a convex rear surface 34 which is integrally connected intermediate its lower and upper ends with the handle member 14. Handle member 14 is U-shaped in cross-section as illustrated in FIG. 4 and is connected through an outwardly flared enlarged end portion 36 to the convex rear surface 34 of the cutting blade 12.

The scraper device is formed of a plastic material, preferably high impact polystyrene and has a spring clip 40 deformed out of the base portion 42 of the handle 14. It is noted that the clip 40 is disposed below the upper end 22 of the blade 12.

The outer free end of the handle 14 is provided with the cutting blade 16 which has a plurality of downwardly extending teeth formed therein.

As seen in FIG. 3, the U-shaped handle 14 has outer side walls 48 and 50 which taper laterally outwardly from each end of the handle to an area intermediate its ends.

Thus it is seen that in operation the scraper device 10 may be moved forwardly across a windshield or the like and the cutting surface 24 on the cutting blade 12 will throw ice and snow or the like upwardly and rearwardly against the concave surface 18 which in turn will throw the material forwardly. The concave surface 18 will normally prevent the usual discharge of the work product over the upper edge 22 and back onto the handle 14. At the end of the forward stroke of the scraper device across the workpiece it may be pulled rearwardly and the cutting surface 32 on the rear end of the shoe portion 30 will function to remove the work product such as snow and ice and direct it downwardly away from the handle 14 in the user's hand and rest. If hardened ice or snow is to be removed or broken, then the end 16 having the teeth 46 may be used. When the scraper device 10 is not in use it may be secured to the sunvisor of a car or other suitable support means by the spring clip 40.

It is noted that the side walls 48 and 50 of the handle 14 give it added strength and that the outwardly flared enlarged portions 36 provide the necessary strength for their integral connection to the rear convex surface 34 of the cutting blade 12.

Some changes may be made in the construction and arrangement of my scraper device without departing from the real spirit and purpose of my invention, and it is my intention to cover by my claims, any modified forms of structure or use of mechanical equivalents which may be reasonably included within their scope.

I claim:

1. A scraper device, comprising,
   a cutting blade having a concave front surface, said blade terminating along its lower edge in a rearwardly tapering front surface when said blade is substantially vertically disposed, a shoe surface defining a cutting edge with the lower edge of said blade and extending rearwardly from the lower edge of said tapering front surface and terminating in a substantially vertically disposed rear cutting surface, and
   an elongated handle member secured to the back surface of said cutting blade, said handle member extending rearwardly of said front surface.

2. A scraper device, comprising,
   a cutting blade having a concave front surface, a shoe portion disposed along and under said blade when said blade is substantially vertically disposed, said shoe portion having upwardly extending front and rear cutting surfaces, and an elongated handle member secured to the back surface of said cutting blade and extending rearwardly of said front surface.

3. A scraper device, comprising,
a cutting blade having a concave front surface, said concave front surface having a constant radius of curvature, the center of said radius of curvature being disposed in a vertical plane extending through the lower front edge of said cutting blade, and said cutting blade having an upper edge terminating rearwardly of said vertical plane, a shoe portion disposed along and under said blade when said blade is substantially vertically disposed, said shoe portion having upwardly extending front and rear cutting surfaces, and
an elongated handle member secured to the back surface of said cutting blade and extending rearwardly of said front surface.

4. The structure of claim 3 and a spring clip is provided in the upper side of said handle.

5. The structure of claim 3 wherein said handle is U-shaped in cross-section and constructed from a resilient material, a spring clip is deformed out of the base of said handle, said U-shaped handle being downwardly facing.

6. A scraper device, comprising,
a cutting blade having a concave front surface, a shoe portion disposed along and under said blade when said blade is substantially vertically disposed, said shoe portion having upwardly extending front and rear cutting surfaces,
an elongated handle member secured to the back surface of said cutting blade and extending rearwardly of said front surface, and
said handle being U-shaped in cross-section and downwardly facing, said handle having an outer end opposite said cutting blade, said outer end being provided with downwardly extending teeth formed in the base portion of said U-shaped handle.

7. A unitary scraper device, comprising,
a cutting blade having a concave front surface, a shoe portion disposed along and under said blade when said blade is substantially vertically disposed, said shoe portion having upwardly extending front and rear cutting surfaces, and
an elongated handle member having one end portion secured to the back surface of said cutting blade, said one end portion being enlarged in width relative to the width of said handle, said handle extending rearwardly of said front surface.

8. A unitary scraper device, comprising,
a cutting blade having a concave front surface and upper and lower edges, a shoe portion extending rearwardly of said lower edge when said blade is substantially horizontally disposed, said lower edge having an upwardly and rearwardly tapering front cutting surface, said shoe portion having a horizontally disposed bottom surface terminating in an upwardly extending rearwardly facing cutting surface, and
an elongated handle member disposed intermediate the width of said cutting blade above said shoe portion and said rearwardly facing surface, said handle member extending upwardly and rearwardly of said cutting blade and below the upper edge of said cutting blade.

References Cited by the Examiner
UNITED STATES PATENTS 2,277,528  3/1942  Osborn _____ 15—236
2,719,316  10/1955  Hauser.

WILLIAM FELDMAN, *Primary Examiner.*

R. V. PARKER, JR., *Assistant Examiner.*